United States Patent [19]

Horiuchi et al.

[11] Patent Number: 4,774,608
[45] Date of Patent: Sep. 27, 1988

[54] FRONT LOADING APPARATUS FOR DISC DRIVE UNIT

[75] Inventors: Hiroshi Horiuchi, Neyagawa; Hideaki Aoki, Kyoto, both of Japan

[73] Assignee: Sanyo Electric Co., Ltd., Osaka, Japan

[21] Appl. No.: 894,543

[22] Filed: Aug. 8, 1986

[30] Foreign Application Priority Data

Aug. 10, 1985 [JP] Japan .................................. 60-176150
Aug. 10, 1985 [JP] Japan ........................... 60-122863[U]

[51] Int. Cl.$^4$ ............................................. G11B 5/012
[52] U.S. Cl. ........................................ 360/97; 360/99
[58] Field of Search ............................. 360/97–99, 360/96.5, 86, 133, 137, 263, 270–271; 358/906

[56] References Cited

U.S. PATENT DOCUMENTS

| 4,509,157 | 4/1985 | Morinaga | 369/270 X |
| 4,562,498 | 12/1985 | Shibata | 360/97 |
| 4,631,607 | 12/1986 | Katsumata | 360/96.5 |

FOREIGN PATENT DOCUMENTS

| 143554 | 6/1985 | European Pat. Off. |
| 143442 | 6/1985 | European Pat. Off. |
| 3415412 | 12/1984 | Fed. Rep. of Germany | 360/97 |
| 3439352 | 5/1985 | Fed. Rep. of Germany |
| 2126003 | 3/1984 | United Kingdom |
| 2132807 | 6/1984 | United Kingdom |

Primary Examiner—Stuart N. Hecker
Assistant Examiner—David J. Severin
Attorney, Agent, or Firm—Armstrong, Nikaido, Marmelstein & Kubovcik

[57] ABSTRACT

A front loading apparatus adapted for use in a disc drive unit comprises an outer holder movable to approach or to depart from a central spindle and an inner holder contained in the outer holder and allowed to move toward up and down in the outer holder by a gap formed between the holders, so that a disc cartridge is accurately set by a setting device at a location for storing and reproducing signals in the apparatus. The setting device comprises push pin for pressing the center hub of the disc cartridge toward the central spindle at the stage when the outer holder approaches to the nearest with respect to the central spindle and for releasing the pressing force from the center hub when the outer holder departs substantially from the central spindle.

11 Claims, 5 Drawing Sheets

FRONT LOADING APPARATUS FOR DISC DRIVE UNIT

FIELD IN THE INDUSTRIAL APPLICATION

The present invention relates to a loading apparatus for a disc cartridge comprising a disc rotatably housed in a jacket and applied for storing signals of video, audio or like data, or converting the stored signals into visual pictures, sound or industrial information, the cartridge being transferred from an insertion opening formed at front portion of a storing and reproducing unit to a rear portion thereof so as to be recorded and transduced to a picture, and being positioned there.

BACKGROUND OF THE INVENTION

Recent development has suggested an electronic still camera device in which video signals are stored or recorded in the disc housed in a disc cartridge. The stored or recorded signals are converted into or reproduced to still pictures.

An example of such electronic still camera comprises a camera for storing the video signal in a magnetic disc in the disc cartridge and a reproducing or playback unit for playing the magnetic transducer as already stored.

With reference to FIG. 9, the disc cartridge used for the electronic still camera comprises a disc cartridge jacket 10 of hard material formed into a substantially rectangular and flat shape and provided at outer circumference thereof with a plurality of positioning datum holes 11, 12. The magnetic disc 16 is rotatably housed in the jacket 10 with a small gap toward both radial and axial directions. The disc cartridge jacket is formed on its surface with a window 17 for exposing the magnetic disc 16 to a transducer and has a dust preventive shutter 13 for opening or closing the window 17. Also, the jacket is formed at center portion of both surfaces with an aperture 15 which is located correspondingly to a center hub 14 of the disc 16.

The disc is formed at the center hub 14 with a hole 18 which has substantially triangular shape with each of sides curved into a circular arc, to which a central spindle 9 associated with a drive motor (not shown) is engaged with tight fit and permits to rotate the disc 16.

Already proposed have been various types of loading mechanisms which are to set the disc cartridge 1 at such positions of camera or playback device that the signals are stored and the stored signals are converted into pictures. In this regard, operationability is an important factor particularly in the playback device.

The front loading system is generally adapted for the loading device of a cassette type video tape recorder (VTR). The loading mechanism has the front panel formed with an insertion opening into which a tape cassette is inserted and slightly thrust rearward. The tape cassette is automatically transferred in the horizontal and, thereafter, vertical directions toward the position for storing and reproducing signals in the device.

PROBLEMS TO BE OVERCOME

Accordingly, the present applicant employs the front loading mechanism in the electronic still camera but has overcome difficulties therewith as will be described below.

In particular, when the disc cartridge 1, FIG. 9, is transferred in the horizontal direction in the front loading mechanism and moved then in the vertical direction so as to engage the hole 18 of the center hub 14 with the central spindle 9, the hub 14 must be pressed onto into the spindle 9 because there is no clearance between the hole 18 and the spindle 9. The disc 16 is likely to enter in an inclined orientation with respect to the spindle 9. When this occurs the signals are not correctly stored or reproduced. The disc 16 rotating at high speed generates intense vibration on the planes within the jacket 10.

In addition, the disc cartridge 1 is formed on the lower face of the jacket with a plurality of datum planes and positioning holes 11, 12. The datum positioning holes 11, 12 and the datum planes of disc cartridge jacket 10 are correctly engaged with the positioning pins and the positioning seats provided at the rear portion of the signal storing and reproducing device when the cartridge is properly positioned.

With respect to the front loading mechanism adapted for use in the VTR, receiving a holder therein transfer the cassette through horizontal movement to vertical movement along an L-shaped guide channel. Consequently, the front loading mechanism is required to provide appropriate clearance between the holder and the loading mechanism in order that the transfer of the holder can be smoothly achieved on its way from horizontal direction to vertical direction.

In case of the VTR, the positioning accuracy of the holder, i.e. of the tape cassette, even if the accuracy is poor to some extent, will not cause any problem with respect to storing and reproducing of signals, so far as the tape taken out of the cassette is wound with high accuracy around the cylinder of VTR.

On the other hand, in case of the electronic still camera, the disc cartridge 1 is formed with the positioning datum holes 11, 12, as described above. Because signals are stored and reproduced immediately at the location where the disc cartridge is set the positioning of the disc cartridge 1 is set by fitting the datum hole 11 tightly to the positioning pin in the device.

When the front loading mechanism of the VTR is applied for the electronic still camera device, it is very likely that the positioning datum holes 11, 12 of the disc cartridge 1 are not engaged with the positioning pins due to poor positioning accuracy of the holder.

In the electronic still camera, the disc located at the storing and reproducing position is always pinched between the magnetic transducer and the backup plate, and therefore the disc is preferable to stay in the stage for waiting by discharging the disc cartridge out of the insertion opening, excepting at the time of storing and reproducing. When the front loading mechanism of the VTR is applied for the electronic still camera, it takes a great deal of trouble because the thrusting operation toward the rear portion of the device is required every time the disc cartridge is loaded.

SUMMARY OF THE INVENTION

The object of the present invention is to provide a front loading apparatus for disc drive unit whereby disc cartridge is set at a predetermined accurate position with a loading device.

Another object of the present invention is to provide a front loading apparatus for disc drive unit in which the disc cartridge is loaded into or unloaded from a recording position by means of, for example, remote switch device without thrust by hand.

REFERENCE TO DRAWINGS

Figure 8:
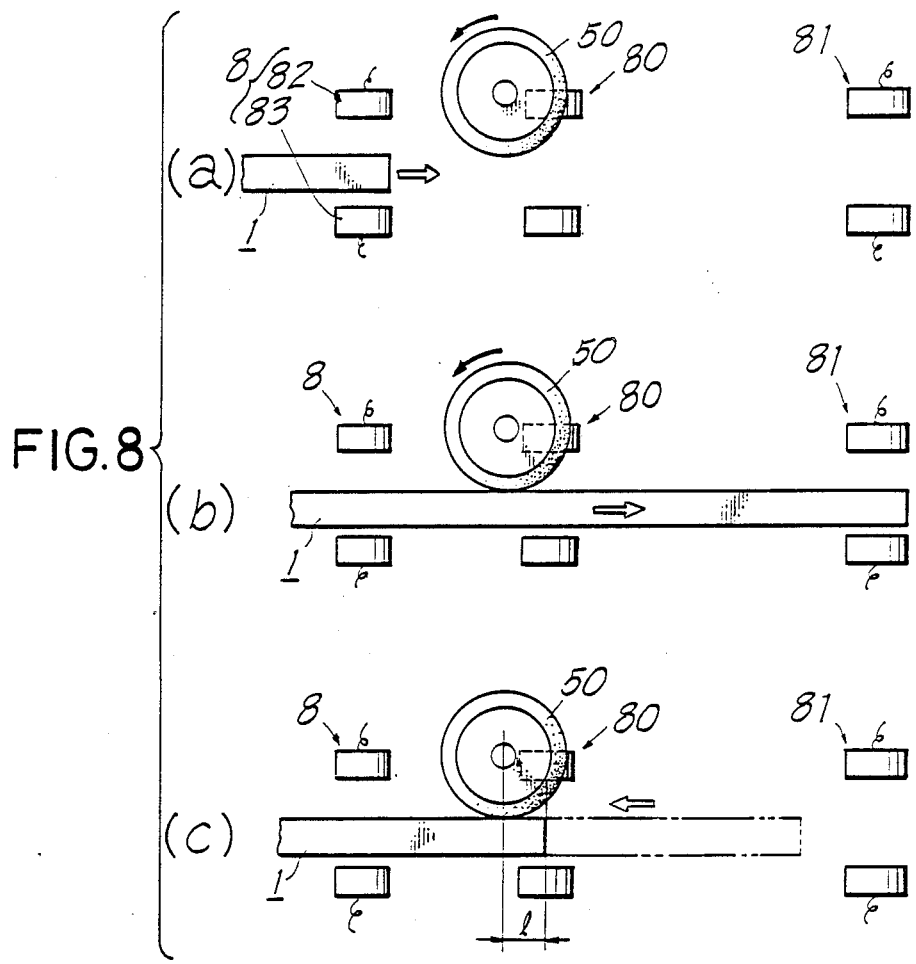

FIG. 8a to c is side elevation view explaining each stage of controlling means.

Figure 9:
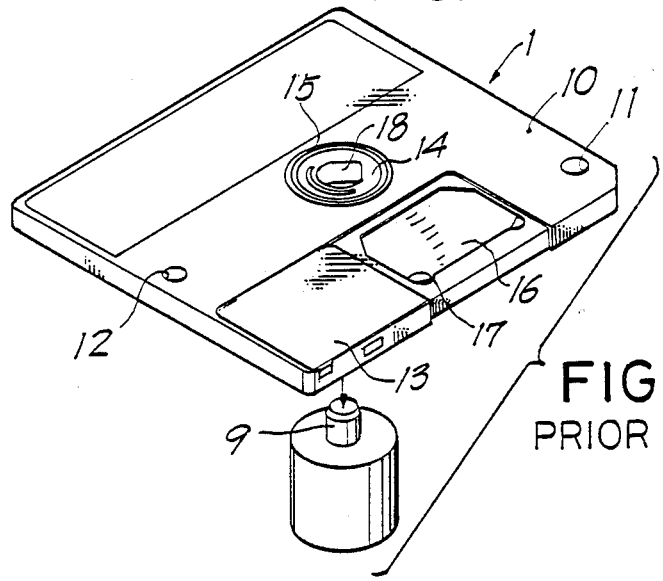

FIG. 9 is a perspective view of a conventional disc cartridge.

Figure 10:
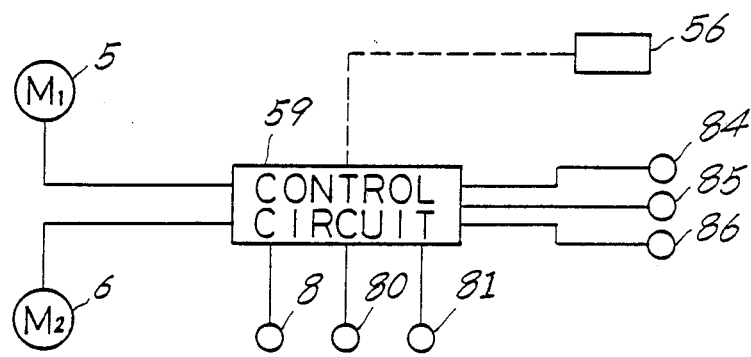

FIG. 10 is a block diagram of a control circuit.

Figure 1:
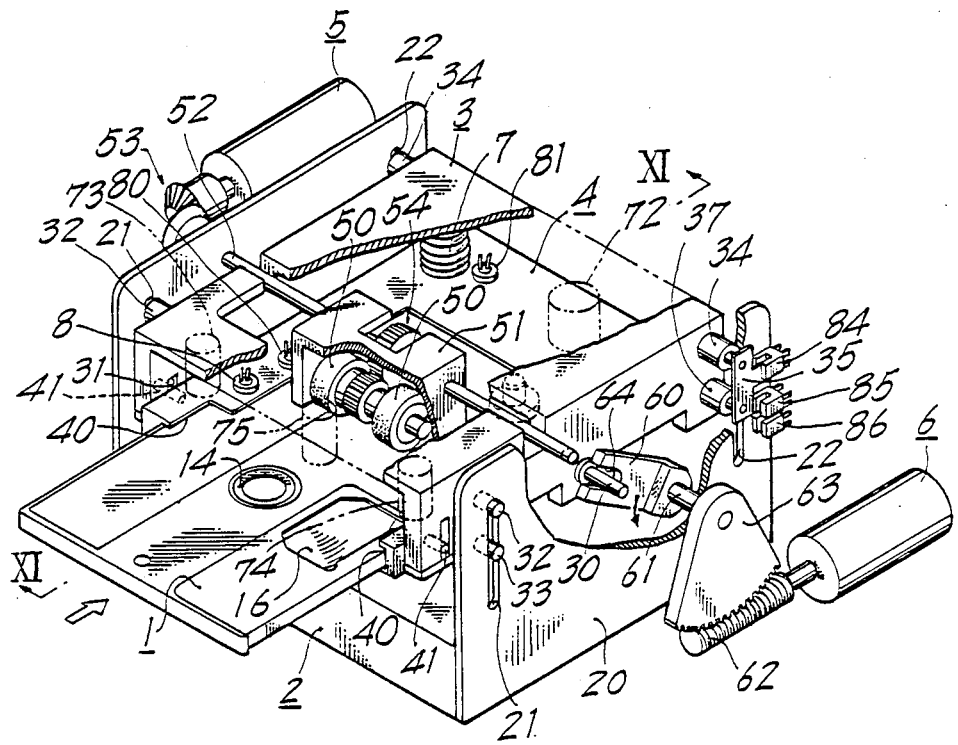
FIG. 1 is a partially broken perspective view of an embodiment of the present invention showing disc-drive apparatus of front loading type.
Figure 11:
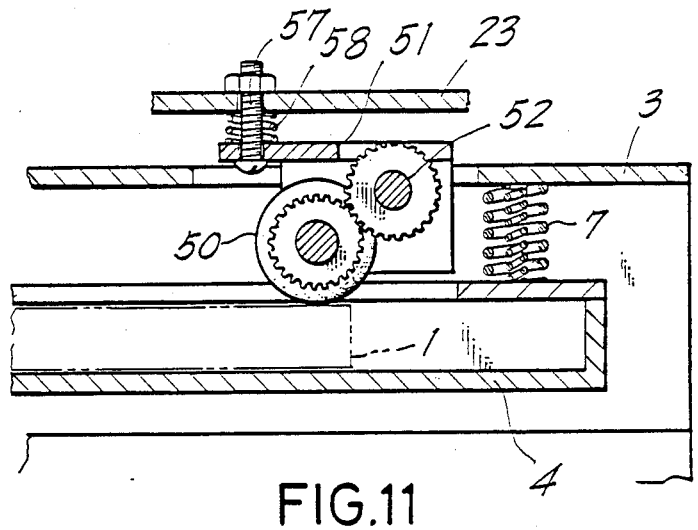

FIG. 11 is a sectional view taken along line XI—XI in FIG. 1.

DETAILED DESCRIPTION OF THE INVENTION

FIG. 1 shows a playback unit for electronic still camera which is an embodiment of the present invention regarding front loading apparatus for disc drive unit.

A frame 2 is provided with a central spindle 9 at the center of its top plate and comprises drive motor (not shown) to rotate the spindle 9.

Both side plates 20 and 20 of the frame 2 support an inner holder 4 and an outer holder 3 allowing movement of holders 4 and 3 upward and downward. Both inner and outer holders 3 and 4 fit together allowing play between them enabling independent upward and downward movement relative to each other.

The inner holder 4 is formed with guide channels 40, 40 at its both inner sides for the disc cartridge 1 to enter horizontally.

The disc cartridge 1 which is inserted to the opening of the guide channel is carried to the rear portion of the inner holder by means of a first thrust means and rests there.

Slide pins 41, 41 are projecting outwardly from both side walls of inner holder 4. The slide pins 41, 41 are received by slide holes 31 which are formed vertically at both side walls of outer holder 3. The inner holder 4 is thereby allowed movement to the direction of upward and downward to the extent of the length of slide hole 31.

The outer hole 3, containing the inner holder 4 allowing holders 3 and 4 to move in the upward and downward direction within a limited stroke as mentioned above, comprises plurality of pins 32, 33, 34 and 37 projecting outwardly from both side walls. Those pins are received by a front guide hole 21 and rear guide hole 22 formed vertically at front and rear portion of the frame 2 and enable vertical movement of the outer holder 3 within the length of the guide holes. The outer holder 3 is also provided with primary pins 30 projecting outwardly on its opposite side walls to be driven by drive arms 60, 60 which shall be mentioned hereafter.

Between the upper wall of the inner holder 4 and the inside surface of the outer holder 3, the first to the fifth coiled springs 7, 72, 73, 74 and 75 are provided which force holders 3, 4 separated upward and downward respectively.

At the ordinary stage when no disc cartridge 1 is contained in the inner holder 4, the inner holder 4 is pressed downwardly till the slide pin 41 reaches the lower end of slide hole 31 and stays there at the most separated distance away from the outer holder 3.

Figure 5:
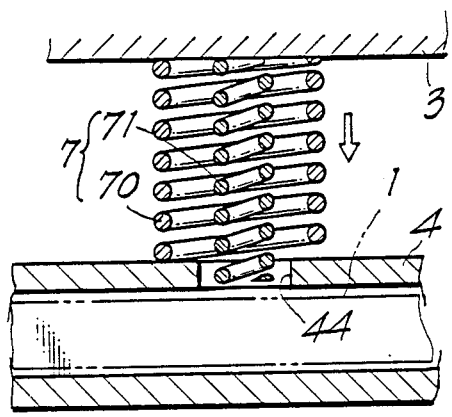
FIG. 5 is a sectional view of springs mounted between inner and outer holders.

As shown in FIG. 5, the first, the third and the fifth coiled springs 7, 72, 75 consist of an outer spring 70 and inner spring 71 coaxially positioned. The outer spring 70 is mounted between the outer holder 3 and the inner holder 4. The inner spring 71 is fixed at its upper termination to the outer holder 3 and terminates at its lower end in hole 44 opened on the inner holder 4.

Figure 2:
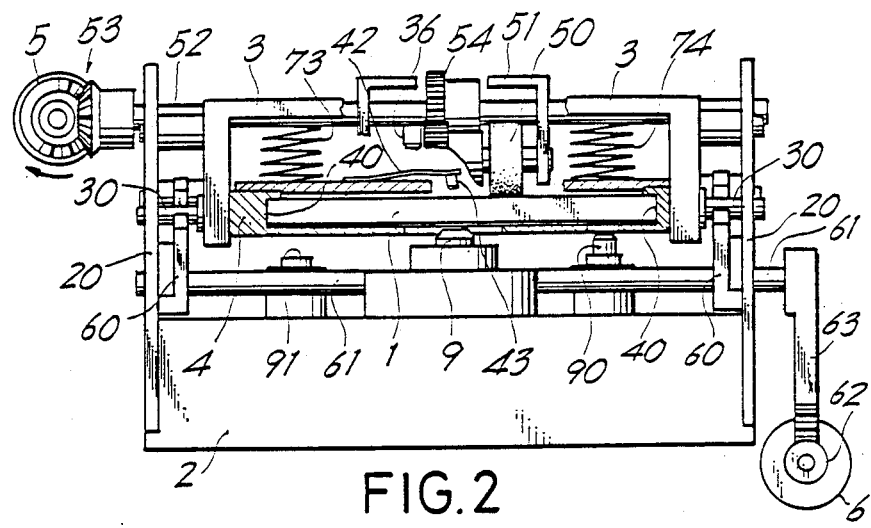
FIG. 2 is a front elevation view of the disc-drive apparatus at the stage when horizontal transfer of the disk cartridge is completed.

As shown in FIGS. 1 and 2, the upper wall of the inner holder 4 is formed with an opening to allow rollers 50 access to the disc cartridge inserted in the inner holder 4.

The lower plate of the inner holder 4 is formed with an aperture at the central area for the central spindle 9 and holes at corresponding position to the positioning datum pins 90 and datum seat 91. As shown in FIG. 11, a roller bracket 51 is located over the inner holder 4. The roller bracket 51 is suspended with a drive shaft 52 extending through both side plates 20, 20 of the frame 2, and with a bolt 57 projecting from an upper plate 23 of the frame. The roller bracket 51 has a pair of rollers 50, 50 driven through a spur gear train 54 provided between the drive shaft 52 and the rollers 50, 50. The rollers 50, 50 are positioned to enter the opening on the upper wall of the inner holder 4 and touch the upper configuration of the disc cartridge in the inner holder with a predetermined pressure exerted by a spring 58 provided between the upper plate of the frame and bracket 51.

A shaft 61 is rotatably supported at the rear lower portion of side plates 20, 20 of the frame 2, and U-shaped arms 60 having channel 64 at its tip are mounted at opposite terminations of the shaft 61.

In the channel 64 of each arm 60, the primary pins 30 are received which project from the side walls of outer holder 3. The shaft 61 projects outwardly from the right side plate 20 of the frame and mounts a fan gear 63 at the projecting termination.

The fan gear 63 engages with a worm gear 62 which is mounted on a drive shaft of the second motor 6.

Figure 6:
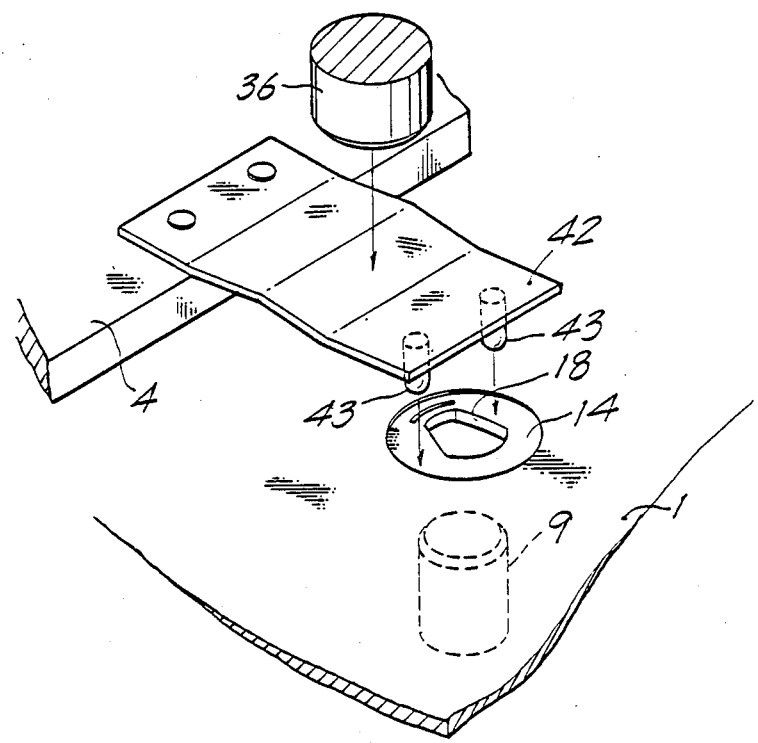
FIG. 6 is a perspective view of setting device.

As shown in FIGS. 2 and 6, a base portion of plate shaped resilient piece 42, is mounted at the central area of the upper wall of the inner holder 4. The resilient piece 42 is provided at its termination with a pair of push pins 43, 43 projecting downwardly. The push pins 43, 43 correspond to the center hub 14 of the disc cartridge positioning at the rearmost in the inner holder 4 and are ready to press the center hub 14 by the resilient deformation of the resilient piece 42. From the upper wall of the outer holder 3, a push piece 36 projects downwardly opposing to the tip of the resilient piece 42. As shown in FIGS. 1 and 8b and a c, the inner holder 4 is provided with three pairs of photo sensors 8, 80, 81, each consisting of a photo emitter 83 and photo receiver 82 opposing each other at the transfer path of the disc cartridge 1. The location of each photo sensor corresopnds to the horizontal transferring mode of the disc cartridge as explained hereafter. The outer holder 3 has a third and a fourth pins 34, 37 at rear portion of its right wall on which are mounting a shutter plate 35. The frame 2, at right side plate 20, has three pairs of photo sensor 84, 85, 86 which are provided along the vertical path of shutter plate 35. The location of each photo sensor corresponds to the mode of vertical transfer of the disc cartridge 1 as explained hereafter and the position of the outer holder at completion of the setting. The first and the second motors 5, 6 are connected to a control circuit 59 to be therey controlled its direction and the angle of their rotation. To the control circuit the signals from the first to the sixth photo sensors 8, 80, 81, 84, 85, 86 are transmitted which work as the signals for switching control. The series of whole driving elements from the first motor 5 to the rubber rollers 50, 50 composes the first drive means and other series of whole driving elements from the second motor 6 to the primary pins 30, 30 composes in the second drive means. Furthermore the resilient piece 42 with push pins 43 composes setting means and the first to sixth photo sensors and the control circuit composes the control means. The operation of the front loading apparatus is described as follows.

(loading operation)

Figure 3:
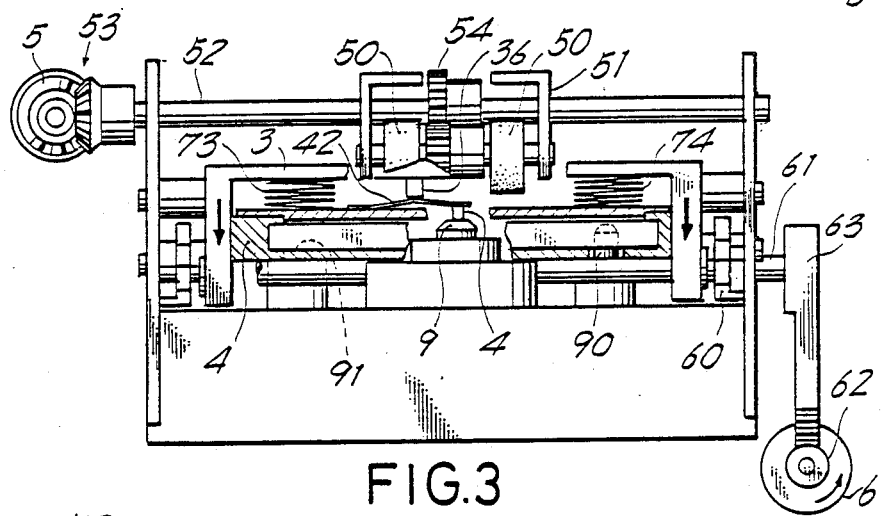
FIG. 3 is a front elevation view of the apparatus when the vertical transfer of the cartridge is completed.

When the disc cartridge is inserted into the opening of the inner holder 4, the cartridge 1 interrupts the photo path of the first photo sensor 8 just before the moment when the foremost portion of the cartridge 1 reaches to the rollers 50 (see FIG. 8a). The first motor 5 thereby starts rotation and dives the rollers 50, 50. By thrusting the disc cartridge further to the rearward direction of the holder, the foremost portion of the cartridge is pressed by the rotating rollers 50, 50 and transferred rearwardly by the rollers. When the disc cartridge 1 is set completely in the inner holder 4, the photo path of the third photo sensor 81 is interrupted by the disc cartridge 1 (FIG. 8b). The first motor 5 is thereby halted and the rollers 50, 50 discontinue rotation. The disc cartridge 1 in the inner holder 4 is located with its spindle hole 18 coaxially aligned with the axis of the central spindle 9 (FIG. 2). Just before the first motor 5 halts its rotation, the second motor 6 starts rotation and drives arms 60, 60 to rotate to the direction of the arrow as shownin FIG. 1, and the outer holder 3 is transferred downwardly as shown in FIG. 3 by the guide of the first to fourth pins 32, 33, 34, 37 along the front and rear guide holes 21, 22.

The inner holder 4, at this stage, is pushed down by the first to fifth springs 7, 72 to 75. The inner springs 71 of the first, second and fifth springs 7, 72 and 75 enter the inner holder 4 at their lowermost termination through the holes 44 provided on the inner holder 4 and press the upper surface of the disc cartridge 1 downwardly. The disc cartridge 1 is fixedly located andhas its central hole 18 fitted to the central spindle 9, has engaged to the positioning pins 90 and has the standard plane at its under configuration contact to the seat 91 for location.

While the outer holder 3 is transferred downwardly, the push piece 36 pressed down the resilient piece 42.

At the end of the downward transfer of the outer holder 3, the second and the fourth pins 33, 34 of the outer holder 3 reach the lowermost position of the front and rear guide holes 21, 22, and push pins 43, 43 press down the center hub 14 of the disc cartridge 1 (see FIG. 6).

Figure 4:
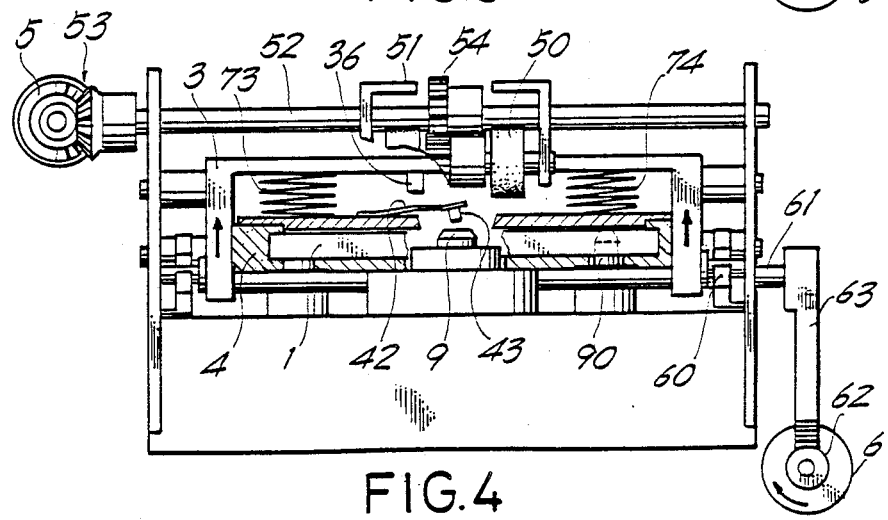
FIG. 4 is a front elevation view of the apparatus when setting of the cartridge is completed.

The magnetic disc 16 in the disc cartridge 1 is thereby set in the predetermined orientation perpendicular to the central spindle 9 and the acurate location. At the instance when the outer holder 3 reaches at its lowermost position as mentioned above, the shutter plate 35 obstruct the photo path of the sixth photo sensor 86, and the second motor 6 discontinues rotation and then begins rotation in the reverse direction. By the reverse rotation of the second motor 6 the outer holder 3 begins to rise. At the heaved position by 2 mm, the shutter plate 35 interrupts the photo path of the fifth photo sensor 85 and the second motor 6 is thereby stopped (see FIG. 4). However, the press to the inner holder 4 by the first to the fifth springs 7, 72 to 75 is maintained leaving inner holder 4 at the lowermost position. The inner holder 4 does not rise with the outer holder 3.

The push piece 36b releases the resilient piece 42 allowing the resilient piece 42 to remain at its original upward position and the push pins 43, 43 to cease pressing the center hub 14. The disc 16 in the disc cartridge 1 is thereby free to rotate and the step of loading is completed. Since the disc 16 is fitting to the central spindle accurately and perpendicularly, the disc 16 is driven at high speed by the rotation of the central spindle 9 without causing plane vibration.

(unloading operation)

After playing back the signals stored in the disc, the disc cartridge is unloaded from the play back unit. By operating an eject button (not shown) provided on a front panel of the play-back unit, the second motor 6 rotates again to elevate the outer holder 3 until the shutter plate 35 interrupts the photo path of the photosenser 84. The outer holder 3 returns to the original position of starting descent as shown in FIG. 2. On the way of rising to return to the original upward position for the outer holder 3, the lowermost end of the slide holes 31, 31 catches the slide pin 41, 41 of the inner holder 4, and elevates the inner holder 3 together. The disc 16 thereby disengages from the central spindle 9 and the disc cartridge 1 touches to the rubber rollers 50, 50 at its uppermost position.

With the signal from the fourth photo sensor 84, the first motor 5 starts rotation in the reverse direction of loading immediately after the stop of the second motor 6. The disc cartridge 1 is transferred to the mouth of the inner holder by the rotation of the rubber rollers 50, 50.

As shown in FIG. 8c, when the cartridge passes the photo path of the second photo sensor 80, the first motor 5 discontinues rotation and the disc cartridge 1 remains pressed by the rollers 50 leaving its foremost portion beyond the roller 50 by the distance l which is approximately 1-2 mm. A part of the disc cartridge 1 is then projecting from the unit as shown in FIG. 1 and is able to be taken out from the unit.

(repeat loading operation)

Where the disc cartridge is pressed by rollers at the completion of the unloading operation, the same loading operation is able to be repeated by operating a start button 56 for loading. When the play-back unit is controlled at a distant place by means of remoted controlling switch, the operation of loading and unloading can be repeated without touching the disc cartridge by hand. The front loading apparatus of the present invention is not only excellent in operation and reliability, but also the whole configuration of the apparatus can be designed in small size because both the first and the second drive means are disposed in compact arrangement.

Figure 7:
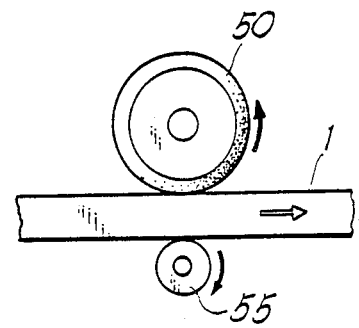
FIG. 7 is a side elevation view of the essential portion of other embodiment.

It should be understood that the individual component of the present invention is not limited to the illustration as that being described in the above explanation and in the drawings but there are various modifications within the scope of the accompanying claims. For example, as shown in FIG. 7, an idle roller 55 may be disposed beneath the rubber rollers for easier transfer of the disc cartridge.

What is claimed is:

1. A front loading apparatus for a disc drive unit for detachably receiving a disc cartridge having a magnetic disc therein and a center hub and being slidably mounted in the unit for horizontal and then vertical movement for fitting said magnetic disc in said disc cartridge to a central spindle characterized by an outer holder movable toward and away from said central spindle, a drive motor for driving said central spindle, an inner holder in said outer holder and movable up and down in said outer holder in a gap formed between said holders for detachably receiving said disc cartridge, said inner holder having a front opening, a first transfer means for transferring a disc cartridge inserted into said front opening of said inner holder from said front opening to the rearmost portion of said inner holder and for transferring said disc cartridge from said rearmost portion to said front opening, a second transfer means for transferring said outer holder toward and away from said central spindle for fitting said disc cartridge in said inner holder and for removing said disc cartridge from said central spindle, a setting means for determining the position and the orientation of said disc cartridge in relation to said central spindle, and a control means for controlling the drive of said first and said second transfer means for transferring said disc cartridge to and from a setting position, said setting means including push pin means for pressing said center hub of said disc cartridge toward said central spindle when said outer holder approaches said central spindle and for elevating the outer holder by a height shorter than the gap between both holders in order to keep apart said push pin means from the disc cartridge during an operation of recording or playing, and for releasing said center hub from said central spindle when said outer holder departs substantially from said central spindle.

2. In the loading apparatus as defined in claim 1, said setting means comprises a resilient piece having a base end and a free end, said base end being mounted on said inner holder, said free end having projecting push pins and a push piece projecting from said outer holder for pushing said resilient piece when there is relative movement between said inner and outer holders.

3. In the loading apparatus as defined in claim 1, springs are provided between the upper circumference of the inner holder and the inside surface of the outer holder to depart the inner holder resiliently from the outer holder.

4. In the loading apparatus as defined in claim 1, base end of springs are fixed on an inner surface of the outer holder and lowermost termination of the springs corresponds to holes opened on the upper wall of the inner holder so as to press the disc cartridge in the inner holder when the outer holder approaches to the inner holder.

5. In the loading apparatus as defined in claim 1, the second transfer means comprises U-shaped arm rotatably supported on the unit and receiving a primary pin projecting outwardly from the side wall of the outer holder, the U-shaped arm associated to a second drive motor.

6. In the loading apparatus as defined in claim 1, the control means comprises detecting device provided on the inner holder, consequently three positions of the disc cartridge in the inner holder are determined at the two positions just before entering and leaving the first transfer means and the position of complete insertion.

7. In the loading apparatus as defined in claim 1, the control means is able to be activated by remote switch operation and the disc cartridge remaining at unloaded position is forced to repeat loading step.

8. In the loading apparatus as defined in claim 1, the control means comprises detecting devices between the outer holder and a frame of the unit to detect the uppermost and lowermost position and further an elevated position of the outer holder departing from the inner holder.

9. In the loading apparatus as defined in claim 8, the detecting device consists of a shutter plate mounted on the outer holder and the first to the third sensors being positioned along the path of the shutter plate.

10. In the loading apparatus as defined in claim 1, the first transfer means comprises rubber rollers rotatably mounted on a roller bracket and associated to a first drive motor.

11. In the loading apparatus as defined in claim 10, the first transfer means comprises idle rollers being provided beneath the rubber roller to pinch the disc cassette between the rubber rollers and idle rollers.

* * * * *